(12) United States Patent
Roth

(10) Patent No.: US 7,201,432 B2
(45) Date of Patent: Apr. 10, 2007

(54) REAR-MOUNTED AIR GUIDE DEVICE FOR A MOTOR VEHICLE

(75) Inventor: Martin Roth, Rutesheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/342,818

(22) Filed: Jan. 31, 2006

(65) Prior Publication Data

US 2006/0186698 A1 Aug. 24, 2006

(30) Foreign Application Priority Data

Feb. 22, 2005 (DE) .................... 10 2005 008 001

(51) Int. Cl.
*B62D 37/02* (2006.01)
(52) U.S. Cl. .................................. 296/180.5
(58) Field of Classification Search ............. 296/180.5, 296/180.3, 217; 180/903
See application file for complete search history.

(56) References Cited

U.S. PATENT DOCUMENTS 6,170,904 B1 * 1/2001 Schaedlich et al. ...... 296/180.1
6,447,050 B1 * 9/2002 Plassmeyer et al. ..... 296/180.5
6,805,399 B1 10/2004 Brown et al.

FOREIGN PATENT DOCUMENTS

DE 42 07 658 C2 7/1994
DE 100 02 511 A1 8/2001
GB 86 10 806.9 4/1986

OTHER PUBLICATIONS

German Search Report.

* cited by examiner

*Primary Examiner*—Joseph D. Pape
(74) *Attorney, Agent, or Firm*—Crowell & Moring LLP

(57) ABSTRACT

A rear-mounted air guide device for a motor vehicle includes an air guide element which can be adjusted in relation to the vehicle body between a retracted inactive position and an extended active position. In the retracted inactive position, the air guide element, which forms the upper body surface in some regions, has a different attack angle than in the extended active position, in which the air guide element extends in a spaced manner to the upper body surface. A device, provided for fastening and adjusting the air guide element, has a simpler design, can be produced more inexpensively, and requires little space, is provided by way of at least one support, seated displaceably on the vehicle body, which can be moved in the vertical direction and which includes on its upper end region a contact area for the air guide element pivoted on the support. The air guide element, in the extended active position, rests in some regions on the contact area of the support and is held in this position by a spring element. In retracted inactive position, the air guide element is swiveled against the action of the spring element and is supported on its bottom by the vehicle body.

20 Claims, 2 Drawing Sheets

REAR-MOUNTED AIR GUIDE DEVICE FOR A MOTOR VEHICLE

This application claims the priority of German application 10 2005 008 001.4, filed Feb. 22, 2005, the disclosure of which is expressly incorporated by reference herein.

BACKGROUND AND SUMMARY OF THE INVENTION

The present invention relates to a rear-mounted air guide device for a motor vehicle including an air guide element which can be adjusted in relation to a vehicle body between a retracted inactive position, forming an upper body surface in some regions and having a different attack angle than in an extended active position, in which the device extends in a spaced manner with respect to the upper body surface, and to a device for fastening and adjusting such an air guide element.

German patent DE 42 07 658 C2 discloses a rear spoiler for a motor vehicle including an air guide element which can be adjusted in relation to the vehicle body between a retracted inactive position and an extended active position. The air guide element, in the retracted inactive position, forms the upper body surface in some areas and has a different attack angle than in the extended active position, in which the element extends spaced from the upper body surface.

The air guide element is fastened and adjusted by at least one kinematic gear including a rocker arm. An end of the rocker arm pointing to the vehicle top is rotatably connected to the air guide element, and the other end thereof is pivoted at the vehicle body. The gear also includes a multi-link joint rod chain, which is rotatably connected to the air guide element and the rocker arm, respectively, and pivoted in a joint rod bearing, which can be adjusted in position, and has a drive for the rocker arm and the joint rod chain.

One disadvantage of this arrangement is that the device used to fasten and adjust the air guide element has a complex configuration with a plurality of components, which results in high costs and a relatively high space requirement in the rear of the motor vehicle.

It is an object of this invention to further develop a device for fastening and adjusting the air guide element of an air guide device such that it has a simplified configuration, can be produced inexpensively, and requires little space.

This object is achieved according to the invention by providing at least one support, which is seated displaceably on the vehicle body and can be moved in the vertical direction. On its upper end region, the support includes a contact area for the air guide element pivoted on the support. The air guide element, in the extended active position, rests in some regions on the contact area of the support and is held in this position by a spring element. In the retracted inactive position, the air guide element is swiveled against the action of the spring element and is supported on its bottom by the vehicle body. Additional features of the invention are apparent from the dependent claims.

Advantages achieved with the invention include provision of a pivoted connection of the air guide element to at least one support that is adjustable in the vertical direction. The arrangement of a spring element between the air guide element and support as well as the contact areas on the supports and the recessed accommodation in the vehicle body also permit the air guide element to be adjusted automatically when retracting and extending the supports. This kinematic arrangement has a simplified design with few components, can be produced inexpensively, and requires little space.

BRIEF DESCRIPTION OF THE DRAWINGS

One example of the invention will be explained in more detail with reference to the drawings.

DETAILED DESCRIPTION OF THE INVENTION

Figure 1:
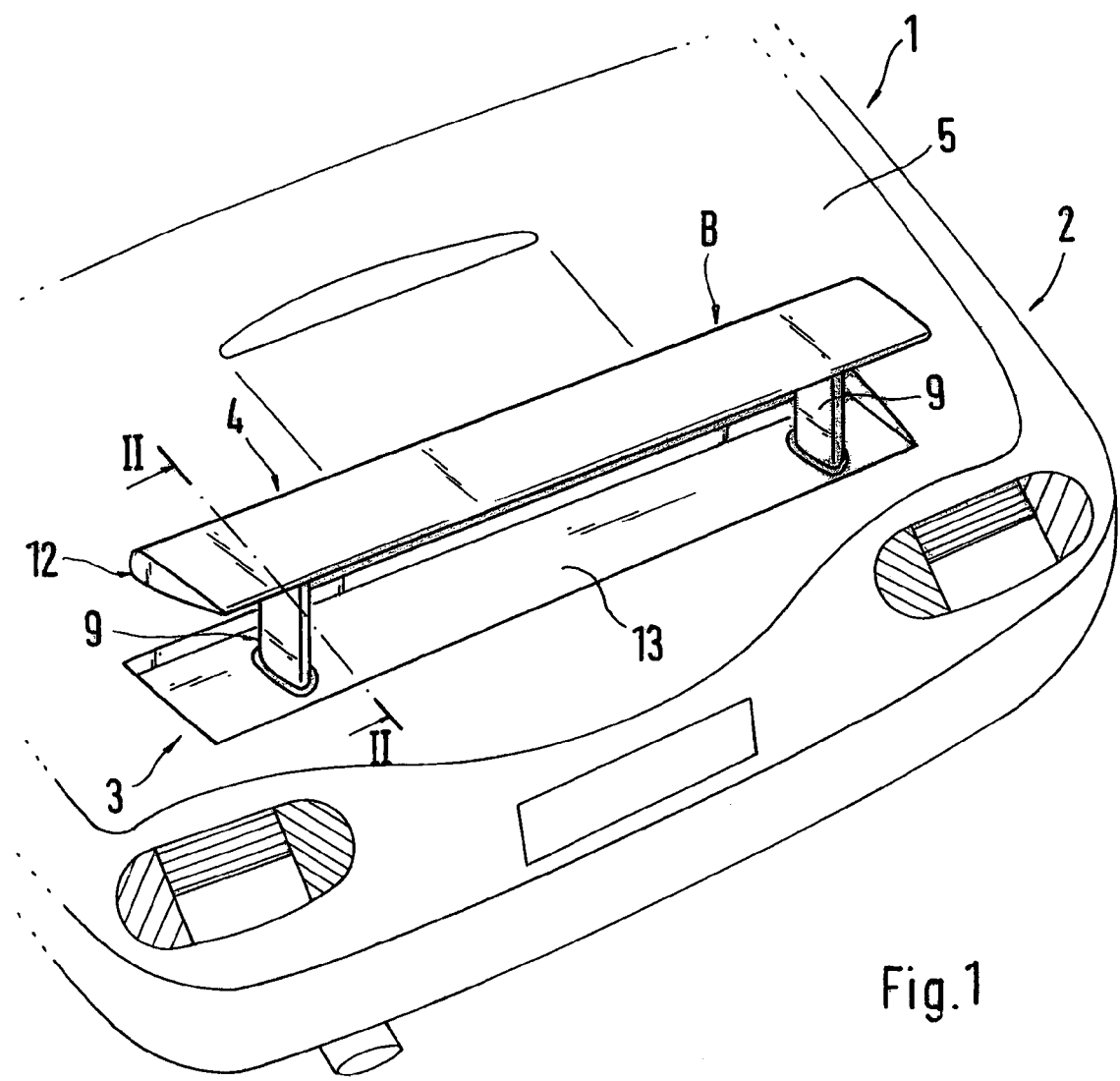
FIG. 1 is a perspective partial view diagonally from the back onto the tail region of a motor vehicle having an air guide device in the extended active position.

A motor vehicle 1 in the form of a sports car includes an air guide device 3 with a wing-like air guide element 4 in a tail region 2. The element is adjustable in relation to an adjoining vehicle body 5 between a retracted inactive position A, in which it forms the upper body surface 6 in some regions, and an extended active position B, in which the element extends in a spaced manner with respect to the upper body surface 6.

Figure 2:
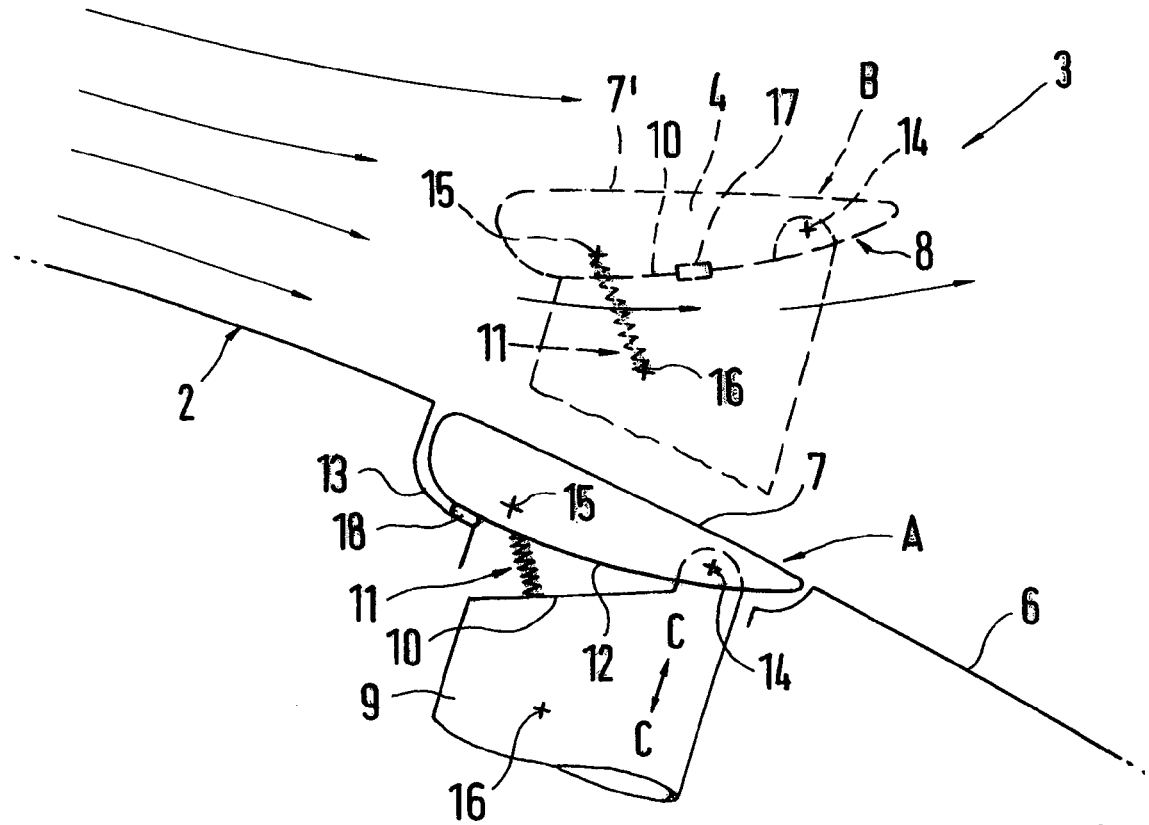
FIG. 2 is a sectional view along line II—II of FIG. 1, in which the continuous line represents the retracted inactive position and the dotted line represents the extended active position of the rear-mounted air guide device, and FIG. 3 a sectional view similar to FIG. 2 through the air guide element and showing aerodynamic forces acting upon it while driving.
Figure 3:
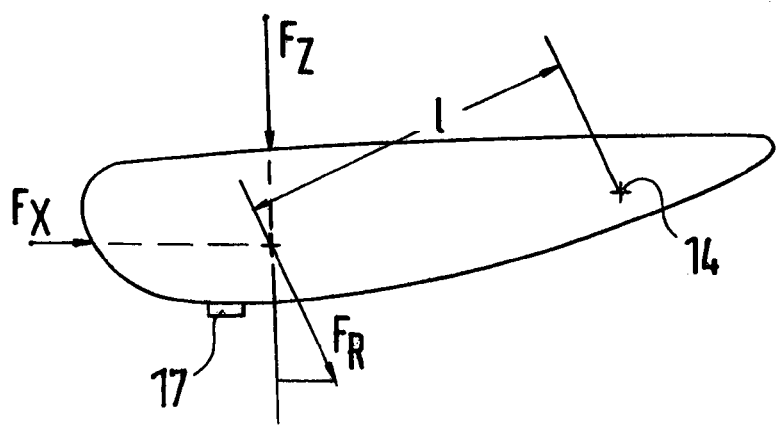

In the retracted inactive position A, the outside 7 of the air guide element 4 extends with its upper surface flush with respect to sections of the fastback-like vehicle body 5 arranged upstream and downstream and has a different attack angle than in the extended active position B. In the active position B, the air guide element 4 is disposed such that the upper outside 7' of the air guide element 4 is arranged either horizontally or at a slight incline towards the rear (FIG. 2).

In order to fasten and adjust the air guide element 4, a device 8 is provided. The device 8 comprises at least one support 9, which is seated on the vehicle body 5, is displaceable in the vertical direction C—C, and comprises at its upper end region at least locally a contact area 10 for the air guide element 4, which is pivoted at the support 9. In the extended active position B, the air guide element 4 rests in some regions on the contact area 10 and is held in this position by a spring element 11. In the retracted inactive position A, the air guide element 4 is swiveled against the action of the spring element 11 and in doing so is supported with its bottom 12 in some regions by a recess 13 of the vehicle body 5 for accommodating the air guide element.

In the illustrated example, two spaced, adjustable supports 9 are provided for adjusting and fastening the air guide element 4 (FIG. 1). Viewed in a cross-sectional perspective, the hollow body-like supports 9 have oval, circular, or similar shapes, and the tops of the supports 9 may be closed off in some regions. On lower end regions, the supports 9 interact with a conventional drive device, which is not shown in detail, such that straight or arched retraction and extension movements of the supports 9 in the vertical direction C—C are guaranteed.

In the illustrated example, the air guide element 4 is rotatably connected in a rear region of its longitudinal extension to an upper end region of each support 9 about a transverse, substantially horizontally aligned axis of rotation 14. A substantially upright spring element 11, the one end 15 of which is connected to the air guide element 4 and the other end 16 of which is connected to the support 9, extends in a spaced fashion to the axis of rotation 14 of the air guide element 4. In this active position B, the spring element 11 pulls the air guide element 4 downward in the direction of the support 9. According to FIG. 2, viewed in the longitudinal direction, the upper end 15 of the spring element 11 is disposed slightly more forward than the rear lower end 16. The spring element 11 is formed by tension spring, a leg spring, a torsion spring at the axis 14 or the like.

So as to avoid noise between the air guide element and the supports 9 in the extended active position B, interposed contact elements 17 are arranged on each support 9 and/or the air guide element 4 in the contact area 10 for the air guide element 4. The contact elements are made, for example, of a suitable plastic or rubber material. In the retracted position A, the development of noise between the air guide element 4 and the adjoining vehicle body 5 is prevented by having additional contact elements 18 interposed between the recessed accommodation 13 and the air guide element 4.

The adjustment movement of the air guide element 4 from the inactive position A, in which the upper surface of the outside is flush with the upper body surface, into the active position B occurs during an initial phase of the extension movement of the two supports 9, while the adjustment movement of the air guide element 4 from the active position B into the inactive position B does not occur until an end phase of the retraction movement of the two supports 9.

The axis of rotation 14 and the contact area 10 are arranged vertically, such that during a driving operation the resultant aerodynamic force $F_R$ generates a moment $M_{Hold}$ in the contact direction ($M_{Hold} = F_R \times L$).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rear-mounted air guide device for a motor vehicle, comprising:
    an air guide element, which can be adjusted in relation to a vehicle body between a retracted inactive position and an extended active position, the air guide element, in the retracted inactive position, forming a portion of an upper motor vehicle body surface and having a different attack angle than in the extended active position, in which the device extends in a spaced manner with respect to other portions of the upper motor vehicle body surface, and
    a device provided for fastening and adjusting the air guide element, having at least one support, which is seated displaceably on the vehicle body, can be moved in the vertical direction, and comprises, on its upper end region, a contact area for the air guide element pivoted on the support,
    wherein the air guide element, in the extended active position, rests in some regions on the contact area of the support and is held in this position by a spring element, and
    wherein the air guide element, in the retracted inactive position, is swiveled against action of the spring element and is supported on its bottom by the vehicle body.

2. The rear-mounted air guide device according to claim 1, wherein two spaced supports are provided for fastening and adjusting the air guide element.

3. The rear-mounted air guide device according to claim 1, wherein any pivoted seating between the support and the air guide element is provided on a front or rear end region of the air guide element, viewed in the vehicle longitudinal direction, and occurs by way of a substantially horizontally aligned axis of rotation along which the air guide element is pivoted on the support, which extends in the vehicle transverse direction.

4. The rear-mounted air guide device according to claim 1, wherein the spring element extends in a spaced manner with respect to the axis of rotation of the air guide element, wherein one end of the spring element is connected to the air guide element, and wherein the other end of the spring element is connected to the support.

5. The rear-mounted air guide device according to claim 1, wherein the spring element is formed by any of a tension spring, a leg spring, and a torsion spring.

6. The rear-mounted air guide device according to claim 1, wherein a contact element is interposed in the contact area for the air guide element on each support or on the air guide element.

7. The rear-mounted air guide device according to claim 6, wherein at least one other contact element is interposed in a recess of the vehicle body for accommodating the air guide element.

8. The rear-mounted air guide device according to claim 3, wherein pivoted seating between the support and the air guide element is arranged in a rear area of the air guide element.

9. The rear-mounted air guide device according to claim 3, wherein the axis of rotation and the contact area are arranged vertically such that a resultant aerodynamic force generates a moment in the contact direction.

10. The rear-mounted air guide device according to claim 2, wherein any pivoted seating between the support and the air guide element is provided on a front or rear end region of the air guide element, viewed in the vehicle longitudinal direction, and occurs by way of a substantially horizontally aligned axis of rotation along which the air guide element is pivoted on the support, which extends in the vehicle transverse direction.

11. The rear-mounted air guide device according to claim 2, wherein the spring element extends in a spaced manner with respect to the axis of rotation of the air guide element, wherein one end of the spring element is connected to the air guide element, and wherein the other end of the spring element is connected to the support.

12. The rear-mounted air guide device according to claim 3, wherein the spring element extends in a spaced manner with respect to the axis of rotation of the air guide element, wherein one end of the spring element is connected to the air guide element, and wherein the other end of the spring element is connected to the support.

13. The rear-mounted air guide device according to claim 2, wherein the spring element is formed by any of a tension spring, a leg spring, and a torsion spring.

14. The rear-mounted air guide device according to claim 3, wherein the spring element is formed by any of a tension spring, a leg spring, and a torsion spring.

15. The rear-mounted air guide device according to claim 4, wherein the spring element is formed by any of a tension spring, a leg spring, and a torsion spring.

16. The rear-mounted air guide device according to claim 2, wherein a contact element is interposed in the contact area for the air guide element on each support or on the air guide element.

17. The rear-mounted air guide device according to claim 3, wherein a contact element is interposed in the contact area for the air guide element on each support or on the air guide element.

18. The rear-mounted air guide device according to claim 4, wherein a contact element is interposed in the contact area for the air guide element on each support or on the air guide element.

19. The rear-mounted air guide device according to claim 5, wherein a contact element is interposed in the contact area for the air guide element on each support or on the air guide element.

20. The rear-mounted air guide device according to claim 8, wherein the axis of rotation and the contact area are arranged vertically such that a resultant aerodynamic force generates a moment in the contact direction.

* * * * *